(12) United States Patent
Suita et al.

(10) Patent No.: US 8,284,251 B2
(45) Date of Patent: Oct. 9, 2012

(54) TIRE TYPE DETERMINATION METHOD AND VEHICLE INSPECTION METHOD AND SYSTEM USING THE SAME

(75) Inventors: Kazutsugu Suita, Nagoya (JP); Kazufumi Kimura, Nagoya (JP); Rikio Azumaya, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 850 days.

(21) Appl. No.: 12/396,566

(22) Filed: Mar. 3, 2009

(65) Prior Publication Data

US 2009/0244284 A1 Oct. 1, 2009

(30) Foreign Application Priority Data

Apr. 1, 2008 (JP) ................................ 2008-094867

(51) Int. Cl.
*H04N 7/18* (2006.01)
*B62B 1/00* (2006.01)
*B62D 43/00* (2006.01)

(52) U.S. Cl. ............ 348/148; 348/91; 348/92; 348/128; 348/129; 348/130; 280/79.4; 296/37.2

(58) Field of Classification Search .................... 348/91, 348/92, 128, 129, 130, 148, 143
See application file for complete search history.

(56) References Cited

U.S. PATENT DOCUMENTS

| 5,628,596 | A | * | 5/1997 | Halpin et al. | .................. | 410/29 |
| 5,987,978 | A | * | 11/1999 | Whitehead | ...................... | 73/146 |
| 6,124,925 | A | * | 9/2000 | Kaneko et al. | ............. | 356/237.1 |
| 2006/0114531 | A1 | * | 6/2006 | Webb et al. | ..................... | 359/15 |
| 2008/0256815 | A1 | * | 10/2008 | Schafer | ........................... | 33/739 |

FOREIGN PATENT DOCUMENTS

| JP | 63-275487 | 11/1988 |
| JP | 9-277806 | 10/1997 |
| JP | 10-255048 | 9/1998 |
| JP | 2000-67245 | 3/2000 |
| JP | 2008-32519 | 2/2008 |

* cited by examiner

*Primary Examiner* — Ranodhi Serrao
*Assistant Examiner* — Farrukh Hussain
(74) *Attorney, Agent, or Firm* — Oblon, Spivak, McClelland, Maier & Neustadt, L.L.P.

(57) ABSTRACT

In a tire type determination method, a surface image of a tread portion of a tire mounted on a vehicle is captured by a camera fixed at a predetermined position in a tilted hanger conveyor line, which is located downstream in a vehicle-carrying direction with respect to a position at which the tire of the vehicle is lifted from the ground and starts moving diagonally upward. Further, image information is extracted from the surface image of the tread portion, and a tire type is determined by checking the image information against registered information. A vehicle inspection system includes a tire type determination portion and a vehicle type information obtaining portion so as to determine the tire type using the method. A conformance determination portion determines whether the tire type determined by the tire type determination portion conforms to a specified tire type searched based on the vehicle type information.

11 Claims, 2 Drawing Sheets

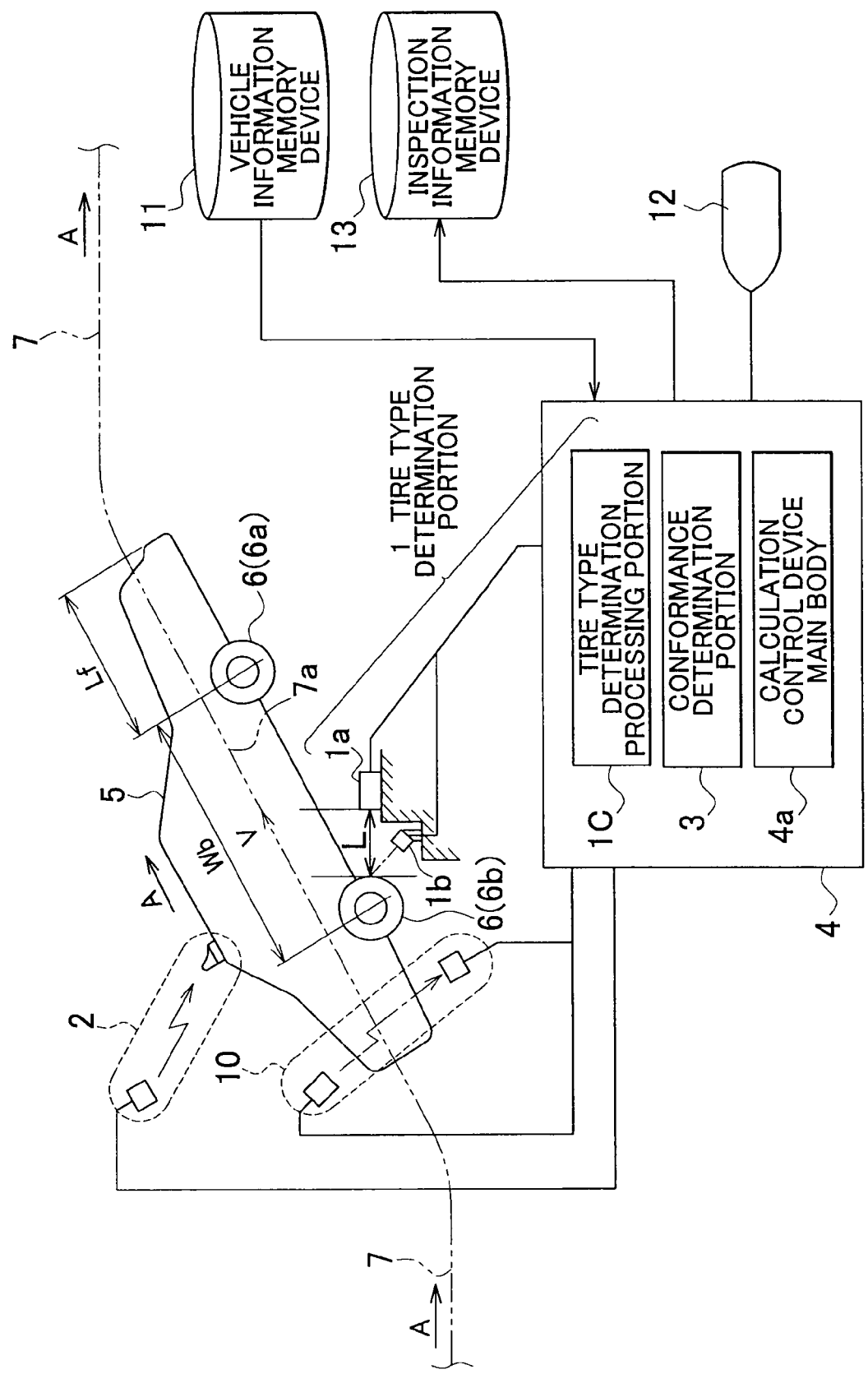

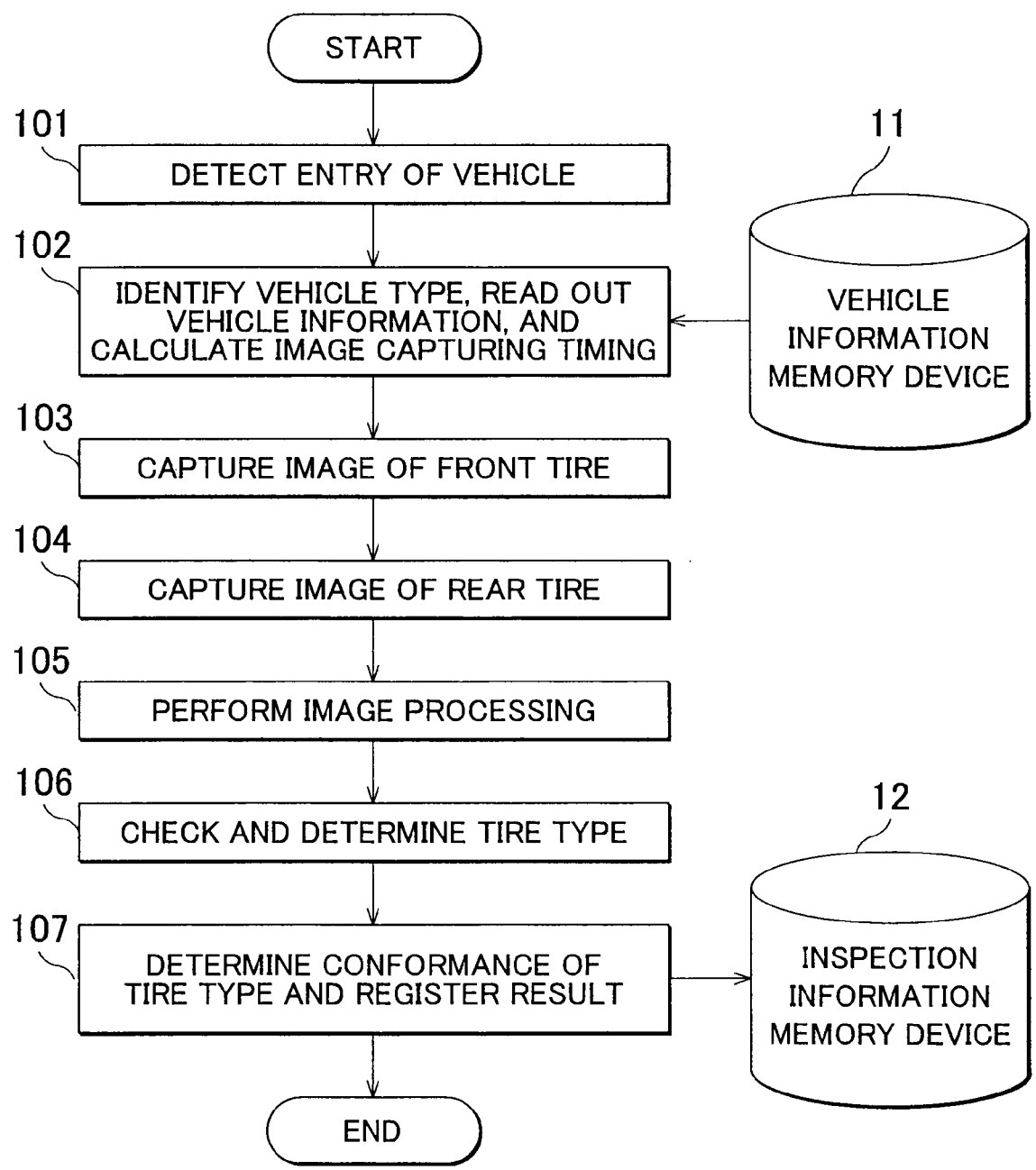

TIRE TYPE DETERMINATION METHOD AND VEHICLE INSPECTION METHOD AND SYSTEM USING THE SAME

INCORPORATION BY REFERENCE

The disclosure of Japanese Patent Application No. 2008-094867 filed on Apr. 1, 2008 including the specification, drawings and abstract is incorporated herein by reference in its entirety.

BACKGROUND OF THE INVENTION

1. Field of the Invention

The invention relates to a tire type determination method in which the type of a tire mounted on a vehicle is determined, and also relates to a vehicle inspection method and a vehicle inspection system in which it is determined whether the type of the tire mounted on the vehicle conforms to the specified tire type of the vehicle.

2. Description of the Related Art

As a related art, Japanese Patent Application Publication No. 9-277806 (JP-A-9-277806) describes a tire type determination method in which the type of the tire mounted on the vehicle is determined. In the tire type determination method of the related art, the tire is placed in contact with a circumferential surface of a drum and rotated in a circumferential direction so as to capture a color image of a surface of a tread portion of the rotating tire. Then, image information related to color tread identification lines is extracted from the captured color image, and checked against registered information related to the color tread identification lines so as to determine the type of the tire.

However, in the related art as described above, the tire type determination method requires the same number of cameras as the number of the tires mounted on the vehicle. For example, four units of cameras are required in the case of a four-wheel vehicle. Further, in the tire type determination method of the related art, it is not possible to perform an in-line inspection (inspection in the carrying process), and moreover, in order to handle various types of vehicles (with various different treads and wheel base lengths), movable portions that move the respective cameras are required so as to capture the images of the tires of the different types of vehicles.

SUMMARY OF THE INVENTION

The invention provides a tire type determination method that allows reduction of the number of the cameras and makes the in-line inspection possible, and further, that allows various types of vehicles to be inspected without using any movable portion that moves the camera. The invention also provides a vehicle inspection method and a vehicle inspection system that use the tire type determination method.

A tire type determination method according to a first aspect of the invention includes: capturing an image of a surface of a tread portion of a tire mounted on a vehicle by a camera that is disposed and fixed at a predetermined position in a tilted hanger conveyor line on which, when the vehicle is carried, the vehicle is hung in a state where a downstream end portion of the vehicle in a carrying direction of the vehicle is tilted up, the predetermined position being located downstream in the carrying direction of the vehicle with respect to a position at which the tire of the vehicle is lifted from the ground and starts moving diagonally upward; extracting image information for identifying a type of the tire from the image of the surface of the tread portion of the tire captured; and determining the type of the tire by checking the image information against registered information for identifying the type of the tire.

A vehicle inspection method according to a second aspect of the invention includes: capturing an image of a surface of a tread portion of a tire mounted on a vehicle by a camera that is disposed and fixed at a predetermined position in a tilted hanger conveyor line on which, when the vehicle is carried, the vehicle is hung in a state where a downstream end portion of the vehicle in a carrying direction of the vehicle is tilted up, the predetermined position being located downstream in the carrying direction of the vehicle with respect to a position at which the tire of the vehicle is lifted from the ground and starts moving diagonally upward; extracting image information for identifying a type of the tire from the image of the surface of the tread portion of the tire captured; determining the type of the tire by checking the image information against registered information for identifying the type of the tire; and determining whether the determined type of the tire conforms to a specified type of the tire of the vehicle by checking the determined type of the tire against the specified type of the tire obtained based on vehicle type information corresponding to the vehicle that is being carried on the conveyor line including the tilted hanger conveyor line.

In the aspects as described above, the methods may further include: detecting a predetermined portion of the vehicle that is being carried on a conveyor line including the tilted hanger conveyor line; and calculating an image capture time based on a time at which the predetermined portion of the vehicle is detected, a distance between the predetermined portion of the vehicle and a center of a downstream wheel in the carrying direction of the vehicle, a conveyor speed of the conveyor line, a wheel base length, and a distance between the camera and the surface of the tread portion of the tire when the surface of the tread portion of the tire is opposed to the camera. In the methods, the camera may capture the image of the surface of the tire at the calculated image capture time. Further, the predetermined portion of the vehicle may be the downstream end portion of the vehicle in the carrying direction of the vehicle.

A vehicle inspection system according to a third aspect of the invention includes: a camera that is disposed and fixed at a predetermined position in a tilted hanger conveyor line on which, when the vehicle is carried, the vehicle is hung in a state where a downstream end portion of the vehicle in a carrying direction of the vehicle is tilted up, and that captures an image of a surface of a tread portion of a tire mounted on a vehicle, the predetermined position being located downstream in the carrying direction of the vehicle with respect to a position at which the tire of the vehicle is lifted from the ground and starts moving diagonally upward; an extraction portion that extracts image information for identifying a type of the tire from the image of the surface of the tread portion of the tire captured by the camera; a determination portion that determines the type of the tire by checking the image information against registered information for identifying the type of the tire; a vehicle type information obtaining portion that obtains vehicle type information corresponding to the vehicle that is being carried on the conveyor line including the tilted hanger conveyor line; and a conformance determination portion that searches the registered information stored in a memory device for a specified type of the tire of the vehicle based on the vehicle type information obtained by the vehicle type information obtaining portion, and determines whether the type of the tire determined by the tire type determination portion conforms to the specified type of the tire of the vehicle by checking the determined type of the tire against the specified type of the tire.

In the aspect as described above, the system may further include: a vehicle detection portion that detects a predetermined portion of the vehicle that is being carried on a conveyor line including the tilted hanger conveyor line; and a calculation portion that calculates an image capture time based on a time at which the predetermined portion of the vehicle is detected, a distance between the predetermined portion of the vehicle and a center of a downstream wheel in the carrying direction of the vehicle, a conveyor speed of the conveyor line, a wheel base length, and a distance between the camera and the surface of the tread portion of the tire when the surface of the tread portion of the tire is opposed to the camera. In the system, the camera may capture the image of the surface of the tire at the calculated image capture time. Further, the predetermined portion of the vehicle may be the downstream end portion of the vehicle in the carrying direction of the vehicle. Still further, the camera may be disposed at a position that corresponds to each of a left side and a right side of the vehicle. The system may further include a lighting device that provides lighting of the surface of the tread portion of the tire.

BRIEF DESCRIPTION OF THE DRAWINGS

The features, advantages, and technical and industrial significance of this invention will be described in the following detailed description of embodiments of the invention with reference to the accompanying drawings, in which like numerals denote like elements, and wherein:

FIG. 1 is a configuration diagram showing an embodiment of a vehicle inspection system to which a tire type determination method according to the invention is applied; and FIG. 2 is a flowchart showing a vehicle inspection procedure performed in the vehicle inspection system shown in FIG. 1.

DETAILED DESCRIPTION OF EMBODIMENTS

An embodiment of the invention will be described below with reference to the attached drawings. The same reference numerals in the attached drawings denote the same or equivalent components. FIG. 1 is a configuration diagram showing the embodiment of a vehicle inspection system to which a tire type determination method according to the invention is applied. The vehicle inspection system shown in FIG. 1 includes a tire type determination portion 1 (that includes a color camera 1a, a lighting device 1b, and a tire type determination processing portion 1c, which will be described later in the specification), a vehicle type information obtaining portion 2, a conformance determination portion 3, and a calculation control device main body 4a. Further, a calculation control device 4 includes the tire type determination processing portion 1c, the conformance determination portion 3, and the calculation control device main body 4a.

In this configuration, the tire type determination portion 1 captures an image of a surface of a tread portion of each of tires 6 mounted on a vehicle 5, and extracts image information for identifying the type of the tires 6 (hereinafter referred to as "tire type"). Further, the tire type determination portion 1 determines the tire type mounted on the vehicle 5 by checking the image information against registered information for identifying the tire type. In the embodiment, as the image information and the registered information for identifying the tire type, image information and registered information related to color tread identification lines (hereinafter abbreviated as "tread identification lines") marked on the surface of each of the tires 6. Hereinafter, the image information and the registered information related to the tread identification lines will be referred to as "tread identification line image information" and "registered tread identification line information", respectively. In this specification, the term "type of the tires 6" (that is, "tire type") indicates a classification of the tires 6 that allows identification of various types of the tires 6, in accordance with, for example, the manufacturer, product name, nominal size of the tires 6, and such classification is made possible by the tread identification lines on the tires 6. The tread identification line image information is obtained by processing the color image of the surface of the tread portion of each of the tires 6 in order to identify the tire type of the tires 6, and may be information containing the image itself, or may be information obtained by encoding such image information. The registered tread identification line information means individual information related to various types of the tread identification lines used for identifying various types of the tires 6, and is registered in advance in a memory device that will be described later in this specification. The registered tread identification line information may be information containing the image itself, or may be information obtained by encoding such image information. The tire type determination portion 1 will be described later in detail.

In the embodiment, the tire type determination portion 1 is configured as described below. Generally, a vehicle conveyor line in the production line of the vehicle 5 is constructed as an overpass at the intersection with a passageway for production line workers, etc. Typically, as such an overpass vehicle conveyor line, a hanger conveyor 7 is employed to carry the vehicle 5 in a state where the vehicle 5 is hung. At least an uphill portion of the hanger conveyor 7 is a conveyor line on which the hanged vehicle 5 is carried in a state where the rear of the vehicle 5 is tilted down (that is, a downstream end portion of the vehicle 5 is tilted up). Note that, the uphill portion of the hanger conveyor 7 will be hereinafter referred to as "rear-down hanger conveyor line 7a", which functions as a tilted hanger conveyor line. In the embodiment, the configuration of the rear-down hanger conveyor line 7a as described above is utilized to determine the tire type. Specifically, the color camera (hereinafter abbreviated as "camera") 1a is disposed and fixed at a predetermined position in the rear-down hanger conveyor line 7a, which is located downstream in a carrying direction of the vehicle 5 with respect to a position in the rear-down hanger conveyor line 7a at which the front tires 6a of the vehicle 5 are lifted from the ground and starts moving diagonally upward. In this configuration, the camera 1a captures a color image of a surface of the tread portion of each of the tires 6. In the embodiment, the camera 1a is disposed near the position at which the vehicle 5 is hung in a state where the rear of the vehicle 5 is tilted down and starts moving diagonally upward so that a lens of the camera 1a is directed in a substantially horizontal direction (the term "substantially horizontal direction" includes horizontal direction) to capture the color image of the surface of the tread portion of each of the tires 6. Note that, the color image of the surface of the tread portion of the tire 6 will be hereinafter abbreviated as "tread portion surface image". If the lens of the camera 1a is directed in the substantially horizontal direction, dusts are less likely to attach to a surface of the lens of the camera 1a. Further, in the embodiment, the lighting device 1b is provided so as to provide lighting of the surface of the tread portion of the tire 6 during the image capturing process in order to eliminate the influence of the outside light on the image capturing and to obtain clear tread portion surface images.

In the embodiment, the tread portion surface image of each of the tires 6 of the vehicle 5 is captured by utilizing the configuration of the rear-down hanger conveyor line 7a, because there is a sufficiently large space below the rear-down hanger conveyor line 7a enough to capture the tread portion surface image without interfering carrying of the vehicle 5. Further, the space is sufficiently larger than the size of the camera 1a. Therefore, it is possible to flexibly set the position at which the camera 1a is fixed, and in particular, it is possible to dispose the camera 1a in a manner such that the lens of the camera 1a is directed in the substantially horizontal direction as described above, whereby it is possible to suppress the adhesion of dusts to the surface of the lens of the camera 1a.

The tread portion surface image of each of the tires 6 captured by the camera 1a is processed and extracted as the tread identification line image information of the tire 6. The extracted tread identification line image information is checked against the registered tread identification line information of the tires 6 to determine the tire type of the tire 6 mounted on the vehicle 5. More specifically, the tire type is determined by checking the tread identification line image information against the registered tread identification line information to search for the tread identification lines for which the tread identification line image information matches the registered tread identification line information, and outputting the tire type that has the tread identification lines matched. In the embodiment, the image processing, extraction processing, check/search processing are performed by the tire type determination processing portion 1c included in the calculation control device 4.

Here, it is assumed that the camera 1a can capture the tread portion surface image that is well focused and is of best quality when the surface of the tread portion is opposed to the camera 1a with a distance L therebetween. Further, it is also assumed that the hanger conveyor 7 is operated in a direction indicated by the arrow A in FIG. 1 so that the vehicle 5 is carried in the direction indicated by the arrow A, and the front side of the vehicle 5 is directed downstream in the carrying direction of the vehicle 5. In this case, the tread portion surface image of a front tire 6a is captured at a first image capture time when the surface of the tread portion of the front tire 6a is opposed to the camera 1a with the distance L therebetween. Next, as shown in FIG. 1, the tread portion surface image of a rear tire 6b is captured at a second image capture time when the surface of the tread portion of the rear tire 6b is opposed to the camera 1a with the distance L therebetween. In this configuration, it is possible to capture the best quality images of the surfaces of the tread portions of the front tire 6a and the rear tire 6b, respectively, using the single camera 1a. The front tire 6a and the rear tire 6b are disposed on each side of the vehicle 5, and therefore, if two units of the cameras 1a (one of the cameras 1a provided on the left side of the vehicle 5 is not shown in FIG. 1) are provided, it is possible to capture the best quality images of the surfaces of the tread portions of all of the four tires 6, front and rear, and right and left.

The two cameras 1a are disposed at respective positions that correspond to trajectories along which the surfaces of the tread portions of the tires 6 on the left side and the right side of the vehicle 5 are moved as the vehicle 5 is carried. A captured area (field of view) of each of the cameras 1a is preliminarily set so that the image processing and the extraction processing, etc. as described above are properly performed with respect to the surfaces of the tread portions of the right and left tires 6. The image capturing region can be adjusted by adjusting the distance L, in other words, the shutter release timing of each of the cameras 1a. In particular, if a camera without a zoom function is employed as the camera 1a, the image capturing region can be adjusted by the shutter release timing of the camera 1a. In the embodiment, a shutter speed and exposure of the camera 1a are fixed at predetermined values. However, the shutter speed and exposure of the camera 1a may be automatically adjusted. Note that, in the embodiment, the camera 1a itself is not moved because the movement of the camera 1a requires a movable portion to move the position of the camera 1a.

A main body 4a of the calculation control device 4 (hereinafter referred to as "calculation control device main body 4a") calculates the first image capture time and the second image capture time as described above based on a detection signal indicative of the front end of the vehicle 5 (hereinafter referred to as "vehicle front end detection signal"; this signal indicates a "vehicle detection time") sent from a vehicle front end/rear end detection portion 10, which detects, in the embodiment, a front end of the vehicle 5, a distance Lf between the front end of the vehicle 5 and a center of the front tire 6a, a conveyor speed V of the rear-down hanger conveyor line 7a, a wheel base length Wb, and a distance between the camera 1a and the surface of the tread portion of the corresponding tire 6 when the surface of the tread portion of the tire 6 is opposed to the camera 1a. After calculation of the first image capture time and the second image capture time, the calculation control device main body 4a outputs a shutter operation signal to shutter operation portions of the cameras 1a at the calculated first image capture time to capture the tread portion surface images of the right and left front tires 6a, and also outputs the shutter operation signal to the shutter operation portions of the cameras 1a at the calculated second image capture time to capture the tread portion surface images of the right and left rear tires 6b. A photoelectric switch, for example, is used as the vehicle front end/rear end detection portion 10.

The vehicle type information obtaining portion 2 obtains vehicle type information from the vehicle 5 that is being carried on a conveyor line (the hanger conveyor 7), including the rear-down hanger conveyor line 7a on which the hanged vehicle 5 is carried in the state where the rear of the vehicle 5 is tilted down. In the embodiment, the vehicle type information obtaining portion 2 includes, for example, an IC tag, and when the vehicle 5 is placed in a rear-down state and the vehicle front end/rear end detection portion 10 outputs the vehicle front end detection signal, the vehicle type information obtaining portion 2 obtains the vehicle type information from the IC tag in a non-contact manner and outputs the vehicle type information to the calculation control device main body 4a. It should be noted that the vehicle type information means the information for identifying the vehicle type. The vehicle type normally indicates the classification of the vehicle 5 classified by the manufacturer, the product name, etc. However, the vehicle type information may be freely defined as long as the tire type that meets the specification of the vehicle 5 (hereinafter referred to as "specified tire type of the vehicle 5") can be identified in the end using the vehicle type information. In the embodiment, the vehicle information for each vehicle type is read out based on the vehicle type information obtained by the vehicle type information obtaining portion 2, and the specified tire type is identified based on the vehicle information. The vehicle information is stored in a vehicle information memory device 11 that is provided as an external device.

In the vehicle information, in addition to the specified tire type, various types of information, such as the distance Lf between the front end of the vehicle and the center of the front tire (the center of a front wheel), the wheel base length Wb, and dimensions of the camera 1*a* and the tread portion of the tire 6 are classified by vehicle type (or vehicle) so as to be searchable. The distance L between the camera 1*a* and the surface of the tread portion of the tire 6, the captured area, and the number of times the image is captured that make it possible to capture the tread portion surface image of best quality may vary depending on the vehicle type, and such information may be included in the vehicle information. The lighting intensity of the lighting device 1*b* has some influence in capturing the tread portion surface image of best quality, and therefore, the lighting intensity for each vehicle type may also be included in the vehicle information.

The conformance determination portion 3 checks the tire type determined by the tire type determination portion 1 against the specified tire type of the vehicle 5 (vehicle type) that is obtained based on the vehicle type information obtained by the vehicle type information obtaining portion 2, and determines whether the tire type determined by the tire type determination portion 1 conforms to the specified tire type obtained based on the vehicle type information obtained by the vehicle type information obtaining portion 2 (this determination will be referred to as a "conformance determination"). The specified tire type of the vehicle 5 is obtained by searching the vehicle information (that functions as registered information) stored in the vehicle information memory device 11 using the vehicle type information obtained by the vehicle type information obtaining portion 2 as a keyword. In the embodiment, the conformance determination portion 3 is provided in the calculation control device 4. The conformance determination portion 3 displays a determination result on a display 12 and stores the determination result in an inspection information memory device 13, which is provided as an external device, as vehicle inspection result information so that the information is used for analysis, statistics, etc. of the vehicle inspection result.

Next, the vehicle inspection procedure according to the embodiment will be described with reference to the flowchart shown in FIG. 2. As shown in FIG. 2, in step 101, it is detected that the vehicle 5 enters the rear-down hanger conveyor line 7*a* when the vehicle front end/rear end detection portion 10 detects the front end of the vehicle 5. The vehicle front end/rear end detection portion 10 sends the vehicle front end detection signal to the calculation control device main body 4*a*.

In step 102, the calculation control device main body 4*a* identifies the vehicle type of the vehicle 5, which has been detected to enter the rear-down hanger conveyor line 7*a* in step 101, based on the vehicle type information obtained by the vehicle type information obtaining portion 2. Then, the vehicle information of the identified vehicle type is read out from the vehicle information memory device 11 and stored in the calculation control device 4. The vehicle information includes, for example, the registered tread identification line information of the tires 6, the distance Lf between the front end of the vehicle 5 and the center of the front tire 6*a*, and the wheel base length Wb, or the captured area, the number of times the image is captured, and the lighting intensity of the lighting device 1*b*, etc. Further, the calculation control device main body 4*a* calculates the first image capture time and the second image capture time at which the images of the tires 6 are captured based on the vehicle information read out from the vehicle information memory device 11, such as the distance Lf and the wheel base length Wb, and the conveyor speed V of the rear-down hanger conveyor line 7*a* and the distance L, etc., which are input to the calculation control device main body 4*a* in advance and stored therein. At the first image capture time, the surface of the tread portion of the front tire 6*a* approaches the camera 1*a* with the distance L therebetween. Further, at the second image capture time, the surface of the tread portion of the rear tire 6*b* approaches the camera 1*a* with the distance L therebetween. In other words, at the first and second image capture times, it is possible to capture the best quality images of the surfaces of the tread portions of the front tire 6*a* and the rear tire 6*b*.

In step 103, when the time reaches the first image capture time while the vehicle 5 is carried on the rear-down hanger conveyor line 7*a*, the calculation control device main body 4*a* operates the camera 1*a* so as to capture the image of the surface of the tread portion of the front tire 6*a*. The captured image is stored in the calculation control device 4.

In step 104, when the time reaches the second image capture time after the first image capture time, the calculation control device main body 4*a* again operates the camera 1*a* so as to capture the image of the surface of the tread portion of the rear tire 6*b*. The captured image is stored in the calculation control device 4 as well.

In step 105, the tire type determination processing portion 1*c* processes the tread portion surface images of the right and left front tires 6*a* and the right and left rear tires 6*b*, which have been captured and stored in step 103 and step 104, and extracts the tread identification line image information of each of the tires 6. In the image processing performed by the tire type determination processing portion 1*c*, it is possible to analyze and process the captured images by, for example, adjusting brightness and contract of the images and clipping of the images, and this makes it possible to appropriately extract the tread identification line image information from the tread portion surface image in the manner as described above.

In step 106, the tire type determination processing portion 1*c* checks the tread identification line image information of the tires 6, which has been extracted in step 105, against the registered tread identification line information included in the vehicle information stored in the vehicle information memory device 11, and extracts the tread identification lines matched, in other words, determines the tire type of the tires 6 mounted on the vehicle 5.

In step 107, the conformance determination portion 3 determines (makes the conformance determination) whether the tire type of each of the tires 6 of the vehicle 5 determined in step 106 conforms to the specified tire type of the vehicle 5 (vehicle type) by positions of the tires 6 (that is, the determination is made for, for example, each of the front right tire 6*a*, the front left tire 6*a*, the rear right tire 6*b*, and the rear left tire 6*b*). In other words, the conformance determination is made by checking the tire type determined in step 106 against the specified tire type obtained based on the vehicle information, which has been read out from the vehicle information memory device 11 and stored in the calculation control device 4 in step 102. The calculation control device main body 4*a* displays the determination result by the conformance determination portion 3 on the display 12, and stores, as the vehicle inspection result information, the determination result in the inspection information memory device 13 that is provided as the external device. In the embodiment, the tire type determination and the conformance determination as to whether the tire types of all of the four tires 6 conform to the specified tire type of the vehicle 5 are collectively made after the image capturing of all the four tires 6 is finished. However, the tire type determination and the conformance determination may be sequentially made for each of the four tires 6 in order of image capturing of the four tires 6.

As described above, in the embodiment, it is no longer necessary to move the vehicle 5 from the production line onto drums in order to determine the tire type, nor to move the camera 1a in order to handle the tread difference and the wheel base length difference among the various types of vehicles, because, in the embodiment, the tires 6 move toward the camera 1a as the vehicle 5 is carried. In this configuration, it is possible to perform the in-line inspection (inspection in the carrying process), and further, it is possible to handle various types of vehicles (with various different treads and wheel base lengths) without using any movable portion to move the camera 1a. Further, it is possible to secure the space below the rear-down hanger conveyor line 7a, which is large enough to capture the images of the tires 6 without interrupting the carrying of the vehicle 5, and also possible to flexibly position the camera 1a in the space. In particular, it is possible to easily set the camera 1a at the position that allows the lens of the camera 1a to be horizontally directed, thereby suppressing adhesion of dusts to the surface of the lens of the camera 1a. Further, in the case of four-wheel vehicles, it is also possible to determine the tire type of all the four tires 6 only by providing a pair of the cameras 1a at the positions corresponding to the left tires and the right tires of the vehicle 5, respectively, to capture the tread portion surface images of the right and left tires 6 of the vehicle 5 by the cameras 1a. Further, because the lighting device 1b that provides lighting of the surface of the tread portion of the tire 6 is provided, it is possible to capture the clear tread portion surface image without suffering the influence of the outside light at the time of the image capturing.

In the embodiment, the image capture times to capture the tread portion surface images are calculated based on, for example, the vehicle information, such as the distance Lf between the front end of the vehicle and the center of the front tire and the wheel base length Wb, and the conveyor speed V of the rear-down hanger conveyor line 7a. However, a pair of non-contact distance meters, such as laser distance meters, which measure the distance L between the surfaces of the tread portions of the tires and the respective cameras, may be provided at positions corresponding to the left tires and the right tires of the vehicle, respectively, so as to capture the images of the tread portion surface images of the tires when such distance meters directly detect that the distances between the surfaces of the tread portions of the tires and the respective cameras become the distance L.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A tire type determination method, comprising:
  detecting a predetermined portion of a vehicle that is being carried on a conveyor line including a rear-down hanger conveyor line;
  calculating an image capture time based on a time at which the predetermined portion of the vehicle is detected, a distance between the predetermined portion of the vehicle that is detected and a center of a downstream wheel in a carrying direction of the vehicle, a conveyor speed of the conveyor line, a wheel base length, and a distance between a camera and a surface of a tread portion of a tire when the surface of the tread portion of the tire is opposed to the camera;
  capturing an image of the surface of the tread portion of the tire mounted on the vehicle at the calculated image capture time by the camera that is disposed and fixed, with a lens of the camera directed in a horizontal direction, at a predetermined position in a space below the rear-down hanger conveyor line on which, when the vehicle is carried, the vehicle is hung in a state where a downstream end portion of the vehicle in a carrying direction of the vehicle is tilted up, the predetermined position being located near a position at which the tire of the vehicle is lifted from the ground and starts moving diagonally upward;
  extracting image information for identifying a type of the tire from the image of the surface of the tread portion of the tire captured; and
  determining the type of the tire by checking the image information against registered information for identifying the type of the tire.

2. The tire type determination method according to claim 1, wherein the predetermined portion of the vehicle is the downstream end portion of the vehicle in the carrying direction of the vehicle.

3. The tire type determination method according to claim 1, further comprising obtaining vehicle type information from the vehicle, wherein the registered information includes the vehicle type information.

4. A vehicle inspection method, comprising:
  detecting a predetermined portion of a vehicle that is being carried on a conveyor line including a rear-down hanger conveyor line;
  calculating an image capture time based on a time at which the predetermined portion of the vehicle is detected, a distance between the predetermined portion of the vehicle that is detected and a center of a downstream wheel in a carrying direction of the vehicle, a conveyor speed of the conveyor line, a wheel base length, and a distance between a camera and a surface of a tread portion of a tire when the surface of the tread portion of the tire is opposed to the camera;
  capturing an image of the surface of the tread portion of the tire mounted on the vehicle at the calculated image capture time by the camera that is disposed and fixed, with a lens of the camera directed in a horizontal direction, at a predetermined position in a space below the rear-down hanger conveyor line on which, when the vehicle is carried, the vehicle is hung in a state where a downstream end portion of the vehicle in a carrying direction of the vehicle is tilted up, the predetermined position being located near a position at which the tire of the vehicle is lifted from the ground and starts moving diagonally upward;
  extracting image information for identifying a type of the tire from the image of the surface of the tread portion of the tire captured;
  determining the type of the tire by checking the image information against registered information for identifying the type of the tire; and
  determining whether the determined type of the tire conforms to a specified type of the tire of the vehicle by checking the determined type of the tire against the specified type of the tire obtained based on vehicle type information corresponding to the vehicle that is being carried on the conveyor line including the tilted hanger conveyor line.

5. The vehicle inspection method according to claim 4, wherein the predetermined portion of the vehicle is the downstream end portion of the vehicle in the carrying direction of the vehicle.

6. The vehicle inspection method according to claim 4, wherein the vehicle type information is obtained from an IC tag in a non-contact manner.

7. A vehicle inspection system, comprising:
   a vehicle detection portion that detects a predetermined portion of a vehicle that is being carried on a conveyor line including a rear-down hanger conveyor line;
   a calculation portion that calculates an image capture time based on a time at which the predetermined portion of the vehicle is detected, a distance between the predetermined portion of the vehicle that is detected and a center of a downstream wheel in a carrying direction of the vehicle, a conveyor speed of the conveyor line, a wheel base length, and a distance between a camera and a surface of a tread portion of a tire when the surface of the tread portion of the tire is opposed to the camera;
   the camera that captures an image of the surface of the tread portion of the tire mounted on the vehicle at the calculated image capture time, and that is disposed and fixed, with a lens of the camera directed in a horizontal direction, at a predetermined position in a space below the rear-down hanger conveyor line on which, when the vehicle is carried, the vehicle is hung in a state where a downstream end portion of the vehicle in a carrying direction of the vehicle is tilted up, the predetermined position being located near a position at which the tire of the vehicle is lifted from the ground and starts moving diagonally upward;
   an extraction portion that extracts image information for identifying a type of the tire from the image of the surface of the tread portion of the tire captured by the camera;
   a determination portion that determines the type of the tire by checking the image information against registered information for identifying the type of the tire;
   a vehicle type information obtaining portion that obtains vehicle type information corresponding to the vehicle that is being carried on the conveyor line including the tilted hanger conveyor line; and
   a conformance determination portion that searches the registered information stored in a memory device for a specified type of the tire of the vehicle based on the vehicle type information obtained by the vehicle type information obtaining portion, and determines whether the type of the tire determined by the tire type determination portion conforms to the specified type of the tire of the vehicle by checking the determined type of the tire against the specified type of the tire.

8. The vehicle inspection system according to claim 7, wherein the predetermined portion of the vehicle is the downstream end portion of the vehicle in the carrying direction of the vehicle.

9. The vehicle inspection system according to claim 7, wherein the camera is disposed at a position that corresponds to each of a left side and a right side of the vehicle.

10. The vehicle inspection system according to claim 7, further comprising a lighting device that provides lighting of the surface of the tread portion of the tire.

11. The vehicle inspection system according to claim 7, wherein the vehicle type information is obtained from an IC tag in a non-contact manner.

* * * * *